US006665155B2

United States Patent
Gill (10) Patent No.: US 6,665,155 B2
(45) Date of Patent: Dec. 16, 2003

(54) SPIN VALVE SENSOR WITH FREE LAYER STRUCTURE HAVING A COBALT NIOBIUM (CONB) OR COBALT NIOBIUM HAFNIUM (CONBHF) LAYER

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 09/803,201

(22) Filed: Mar. 8, 2001

(65) Prior Publication Data

US 2002/0126427 A1 Sep. 12, 2002

(51) Int. Cl.$^7$ ................................................ G11B 5/39
(52) U.S. Cl. ................................................ 360/324.12
(58) Field of Search ............................. 360/324.12, 317, 360/318, 324, 324.11, 314, 315, 316, 318.1, 319, 320.321, 322, 323, 324.1, 324.2, 325, 326, 327; 428/692, 212

(56) References Cited

U.S. PATENT DOCUMENTS

| 5,290,629 | A | * | 3/1994 | Kobayashi et al. | ........ 428/65.7 |
| 5,648,885 | A | | 7/1997 | Nishioka et al. | ............ 360/113 |
| 5,738,946 | A | | 4/1998 | Iwasaki et al. | ............. 428/611 |
| 5,793,279 | A | | 8/1998 | Nepela | ........................ 338/32 |
| 5,891,586 | A | | 4/1999 | Hasegawa et al. | .......... 428/668 |
| 5,895,727 | A | | 4/1999 | Hasegawa | .................. 428/692 |
| 5,905,611 | A | * | 5/1999 | Yoda et al. | ............... 360/324.1 |
| 5,930,085 | A | | 7/1999 | Kitade et al. | ................ 360/113 |
| 5,948,553 | A | | 9/1999 | Kamijo | ........................ 428/692 |
| 5,995,338 | A | | 11/1999 | Watanabe et al. | ............ 360/113 |
| 6,031,692 | A | | 2/2000 | Kawawake et al. | ......... 360/113 |
| 6,052,262 | A | | 4/2000 | Kamiguchi et al. | ......... 360/113 |
| 6,088,195 | A | * | 7/2000 | Kamiguchi et al. | .... 360/324.12 |
| 6,090,480 | A | * | 7/2000 | Hayashi | ...................... 324/252 |
| 6,181,537 | B1 | * | 1/2001 | Gill | ......................... 360/324.2 |
| 6,249,406 | B1 | * | 6/2001 | Gill et al. | .............. 360/324.11 |
| 6,317,299 | B1 | * | 11/2001 | Pinarbasi | ................. 360/324.1 |
| 6,338,899 | B1 | * | 1/2002 | Fukuzawa et al. | .......... 324/252 |
| 6,339,872 | B1 | * | 1/2002 | Chang et al. | .................. 216/22 |
| 6,342,993 | B1 | * | 1/2002 | Sato | ........................... 360/319 |
| 6,400,535 | B1 | * | 6/2002 | Shimazawa et al. | ... 360/324.11 |

FOREIGN PATENT DOCUMENTS

| JP | 10154311 | 6/1998 | ............ G11B/5/39 |
| WO | WO 95/03604 | 2/1995 | ............ G11B/5/66 |

* cited by examiner

Primary Examiner—Brian E. Miller
(74) Attorney, Agent, or Firm—Ervin F. Johnston (57) ABSTRACT

A free layer structure of a spin valve sensor includes a cobalt niobium or cobalt niobium hafnium layer for providing a negative magnetostriction which completely or partially counterbalances a positive magnetostriction of a cobalt or cobalt iron layer wherein the cobalt or cobalt iron layer interfaces a copper spacer layer for increasing the magnetoresistive coefficient dr/R of the head. In one aspect of the invention the free layer structure consists of only the cobalt iron layer and the cobalt niobium or cobalt niobium hafnium layer.

31 Claims, 9 Drawing Sheets

FIG. 11 (PRIOR ART)
(ABS)

SPIN VALVE SENSOR WITH FREE LAYER STRUCTURE HAVING A COBALT NIOBIUM (CONB) OR COBALT NIOBIUM HAFNIUM (CONBHF) LAYER

BACKGROUND OF THE INVENTION

1. Field of the Invention

The present invention relates to a spin valve sensor with a free layer structure having a cobalt niobium or cobalt niobium hafnium layer which has a negative magnetostriction for counterbalancing a positive magnetostriction of the remaining of the layers in the free layer structure.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is preferably parallel to the ABS, is the position of the magnetic moment of the free layer structure with the sense current conducted through the sensor in the absence of signal fields.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

The free layer structure typically employs a nickel iron layer which provides a desirable magnetic softness for the free layer. This means that the free layer has a low uniaxial anisotropy $H_K$ which promotes responsiveness of the free layer structure to signal fields from a rotating magnetic disk. When the free layer structure is highly responsive a small signal field will rotate the magnetic moment of the free layer structure which causes a change in the magnetoresistance of the spin valve sensor. It has been found that when the free layer structure also includes a cobalt iron or cobalt layer, sometimes referred to as a nanolayer, between the nickel iron layer and the spacer layer and interfacing the spacer layer that the magnetoresistance or magnetoresistive coefficient dr/R is improved. In order to obtain a desirable increase in the magnetoresistive coefficient dr/R, it has been further found that the thickness of the cobalt iron or cobalt layer should be at least 10Å. Unfortunately, any thickness of the cobalt iron layer reduces the softness of the free layer structure so that it is not as responsive to signal fields from the rotating magnetic disk. A cobalt based film, such as cobalt (Co) or cobalt iron (CoFe), has a magnetic moment of approximately 1.7 times the magnetic moment of nickel iron (NiFe) for a given thickness. Accordingly, an increase in the ratio of the thickness of the cobalt iron or cobalt layer to the thickness of the nickel iron layer increases the uniaxial anisotropy $H_K$ of the free layer structure and reduces its softness so that it is less responsive to signal fields. Uniaxial anisotropy field is the amount field required to rotate the magnetic moment of the free layer from a position parallel to the ABS to a position perpendicular thereto. One way to overcome the increase in uniaxial anisotropy $H_K$ of the free layer structure, because of an increase in the thickness of the cobalt iron or cobalt nanolayer, is to increase the thickness of the nickel iron layer so as to reduce the above-mentioned ratio. Unfortunately, this reduces the linear bit density of the read head which is the number of magnetic bits which can be read linearly along a track of a rotating magnetic disk.

Further, any increase in the ratio of the thickness of the cobalt or cobalt iron layer to the thickness of the nickel iron layer causes the free layer structure to have a hysteresis. This hysteresis is indicated in a hysteresis loop which is a graph of the magnetic moment M of the free layer in response to an applied field H (signal field) directed perpendicular to the ABS. The hysteresis loop, which is referred to as the hard axis loop, has an opening due to the hysteresis which can be on the order of 5 to 7 oersteds. The opening in the hard axis loop is quantified as hard axis coercivity $H_C$ which is measured from the origin of the x and y axes to the intersection of the loop with the x axis (applied signal). It has been found that when the hard axis coercivity is high the head generates Barkhausen noise which is due to the fact that the magnetic domains of the cobalt based layer are oriented in different directions. Accordingly, as the signal fields rotate the magnetic moment of the free layer some of the magnetic domains do not follow the directions of the signal fields. The magnetic domains that do not readily follow the signal field direction follow behind the signal field direction in an erratic behavior, referred to as jumps in their movements, which causes the aforementioned Barkhausen noise. This Barkhausen noise is superimposed upon the playback signal which is unacceptable.

The aforementioned hysteresis is caused by a positive magnetostriction (+MS) of the cobalt or cobalt iron layer. After fabrication of all of the layers of rows and columns of read heads on a wafer, the wafer is diced into rows and each row is lapped (a grinding process) to form an air bearing surface for each magnetic head. After lapping the row of magnetic heads, the magnetic heads are diced into individual magnetic heads. Unfortunately, the lapping process causes the magnetic head to be in compression at the ABS. Because of the positive magnetostriction of the cobalt or cobalt iron layer the magnetic moment thereof is urged from a parallel position with respect to the ABS toward a perpendicular position with respect thereto. Accordingly, the positive magnetostriction of the cobalt or cobalt iron layer causes the aforementioned hysteresis and is not a desirable ingredient for the free layer structure. With this ingredient the free layer structure is in a multi-domain state which causes a magnetic moment of the free layer structure to be unstable and to move in a jumping fashion. The result is the aforementioned Barkhausen noise and irreproducible signals.

If the hysteresis or opening in the hard axis loop could be eliminated the aforementioned moment versus applied field graph (M/H graph) of the responsiveness of the spin valve sensor would be simply a straight line. This straight line, which is the transfer curve of the read head, indicates that the read head will be magnetically stable upon the application of the signal fields. It is an object of my invention to eliminate or reduce the positive magnetostriction of the free layer structure so that the hysteresis of the moment of the free layer structure is eliminated or minimized.

SUMMARY OF THE INVENTION

In the present invention the free layer structure includes a first free layer composed of cobalt or cobalt iron that interfaces the spacer layer and a second free layer composed of cobalt niobium or cobalt niobium hafnium. The cobalt niobium or cobalt niobium hafnium layer has a negative magnetostriction which can be made to completely counterbalance or least partially counterbalance the positive magnetostriction of the cobalt or cobalt iron layer. Accordingly, with the present invention the cobalt or cobalt iron layer may still be employed next to the spacer layer for increasing the magnetoresistive coefficient dr/R of the spin valve sensor. In another aspect of the invention the free layer structure includes a third free layer of nickel iron with the nickel iron layer being located between the cobalt or cobalt iron layer and the cobalt niobium or cobalt niobium hafnium layer. With this arrangement the nickel iron layer will provide magnetic softness for the free layer structure and will not be affected by the texture of the cobalt niobium or cobalt niobium hafnium layer on top thereof and fabricated subsequent thereto. The cobalt in the cobalt niobium or cobalt niobium hafnium layer should be at least 90%. The niobium causes the layer to have a negative magnetostriction and the hafnium causes the layer to have a positive magnetostriction. Accordingly, the negative magnetostriction may be achieved with niobium only with the layer being cobalt niobium such as $Co_{95}Nb_5$. When this ratio is used the layer can be very thin so as to properly balance the negative magnetostriction against the positive magnetostriction of the remainder of the layers in the free layer structure. Alternatively, the layer may be thicker when hafnium is employed with an exemplary layer being $Co_{92}Nb_5Hf_3$.

Another aspect of the present invention is that the free layer structure consist of only a cobalt or cobalt iron free layer and a cobalt niobium or cobalt niobium hafnium layer. Such a free layer structure would not have a nickel iron free layer which would permit a significant reduction in the thickness of the free layer structure for promoting the linear read bit density of the head. The cobalt niobium or cobalt niobium hafnium layer can be provided with a proper ratio and thickness so that its positive magnetostriction overcomes the negative magnetostriction of the cobalt or cobalt iron layer with a slight amount of negative magnetostriction remaining. The small remaining negative magnetostriction will provide the free layer structure with a small uniaxial anisotropy oriented parallel to the ABS which can be easily rotated by signal fields from the rotating magnetic disk. Accordingly, the free layer structure has a desirable magnetic softness or sensitivity to the signals from the rotating magnetic disk. After construction of the rows and columns of magnetic heads on the wafer, the wafer may be subjected to a longitudinal field (parallel to the ABS) in the presence of heat for rotating the magnetic moment of the cobalt niobium or cobalt niobium hafnium layer parallel to the ABS, which rotation also aligns the magnetic moment of the cobalt iron or cobalt layer parallel to the ABS. In this aspect of the invention, the cobalt or cobalt iron layer interfaces the spacer layer and is located between the spacer layer and the cobalt niobium or cobalt niobium hafnium layer.

An object of the present invention is to reduce the positive magnetostriction of a free layer structure when the free layer structure employs a cobalt or cobalt iron layer next to a spacer layer.

A further object is to provide a magnetically soft free layer structure which does not employ a nickel iron free layer.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
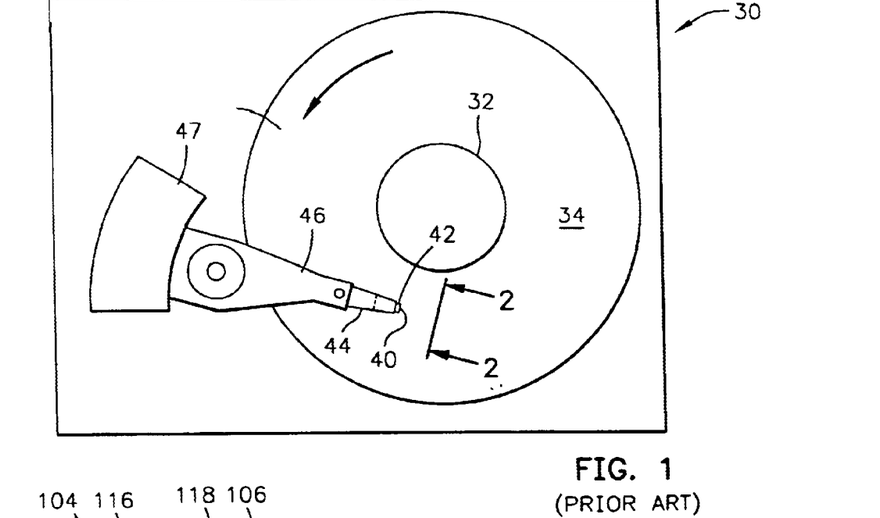
FIG. 1 is a plan view of a magnetic disk drive.
Figure 2:
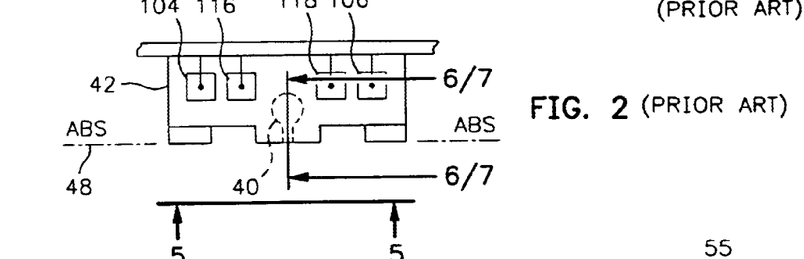
FIG. 2 is an end view of a slider with a magnetic head of the disk drive as seen in plane 2—2 of FIG. 1.
Figure 3:
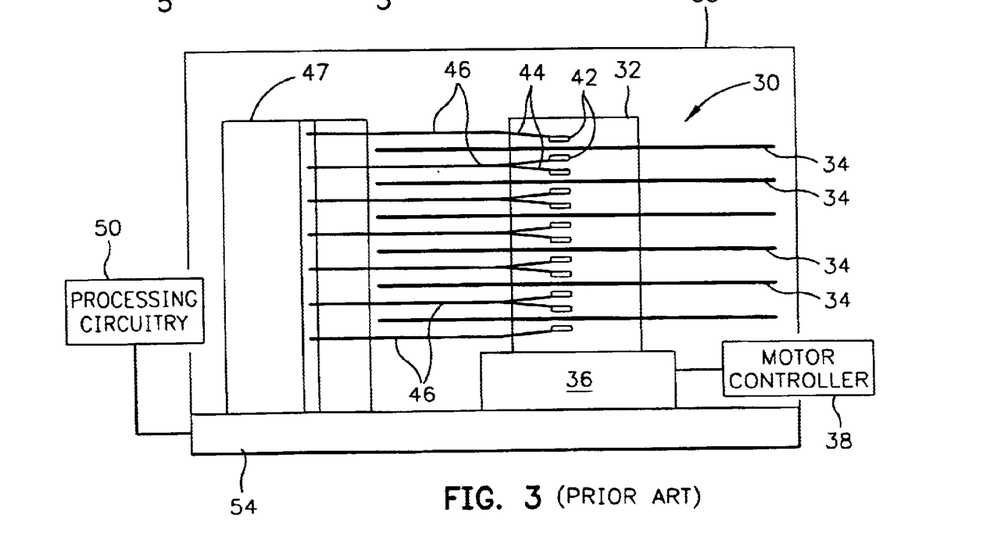
FIG. 3 is an elevation view of the magnetic disk drive wherein multiple disks and magnetic heads are employed.
Figure 4:
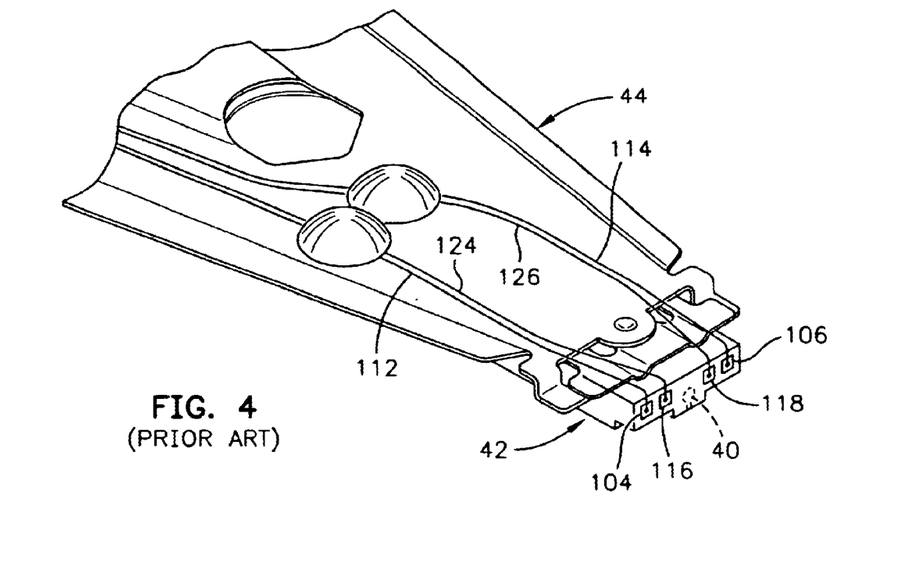
FIG. 4 is an isometric illustration of a suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
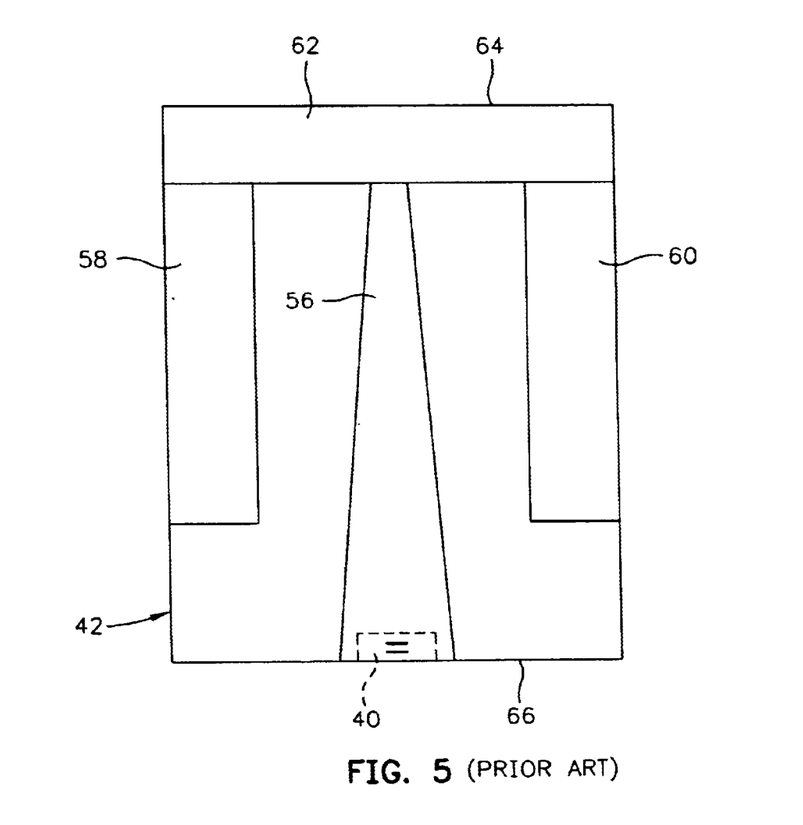
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
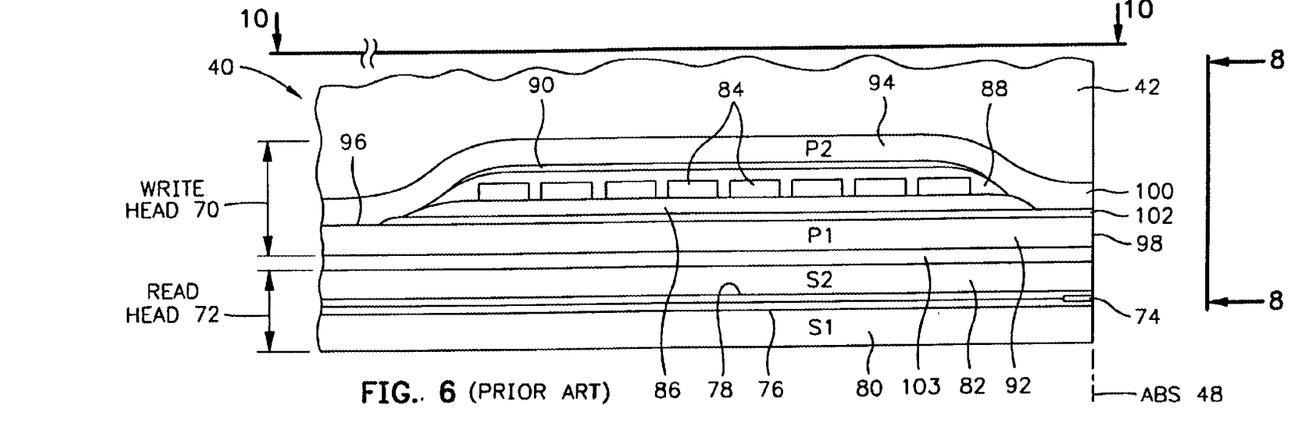
FIG. 6 is a partial view of the slider and a piggyback magnetic head as seen in plane 6—6 of FIG. 2.
Figure 8:
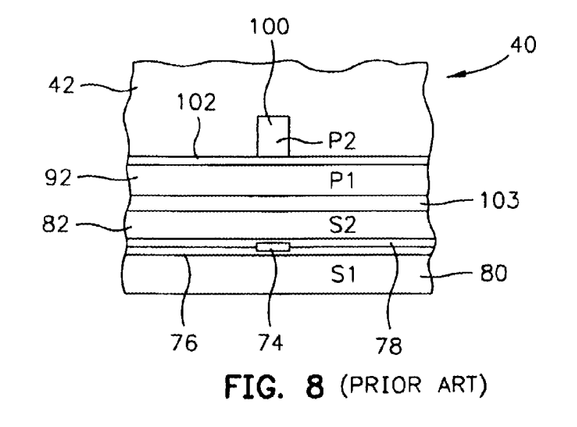
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a dual spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
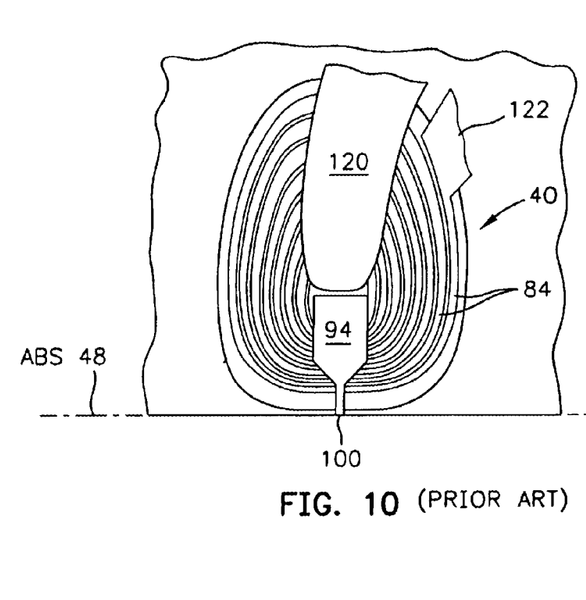
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
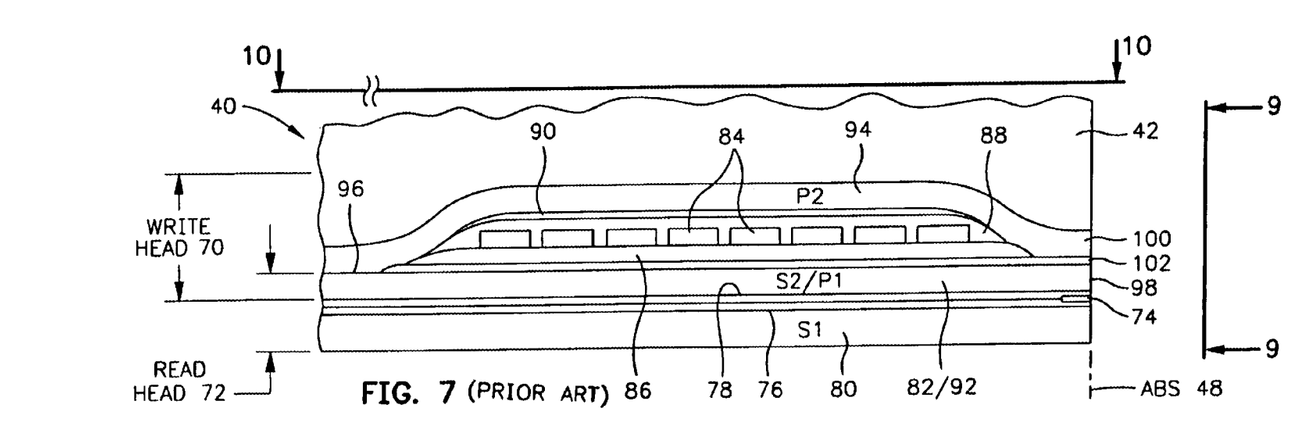
FIG. 7 is a partial view of the slider and a merged magnetic head as seen in plane 7—7 of FIG. 2.
Figure 9:
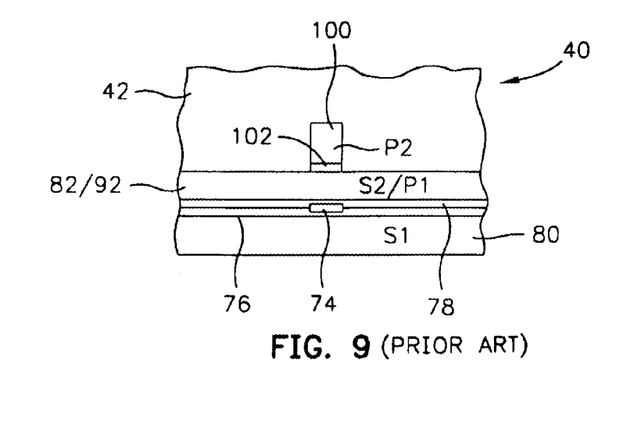
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
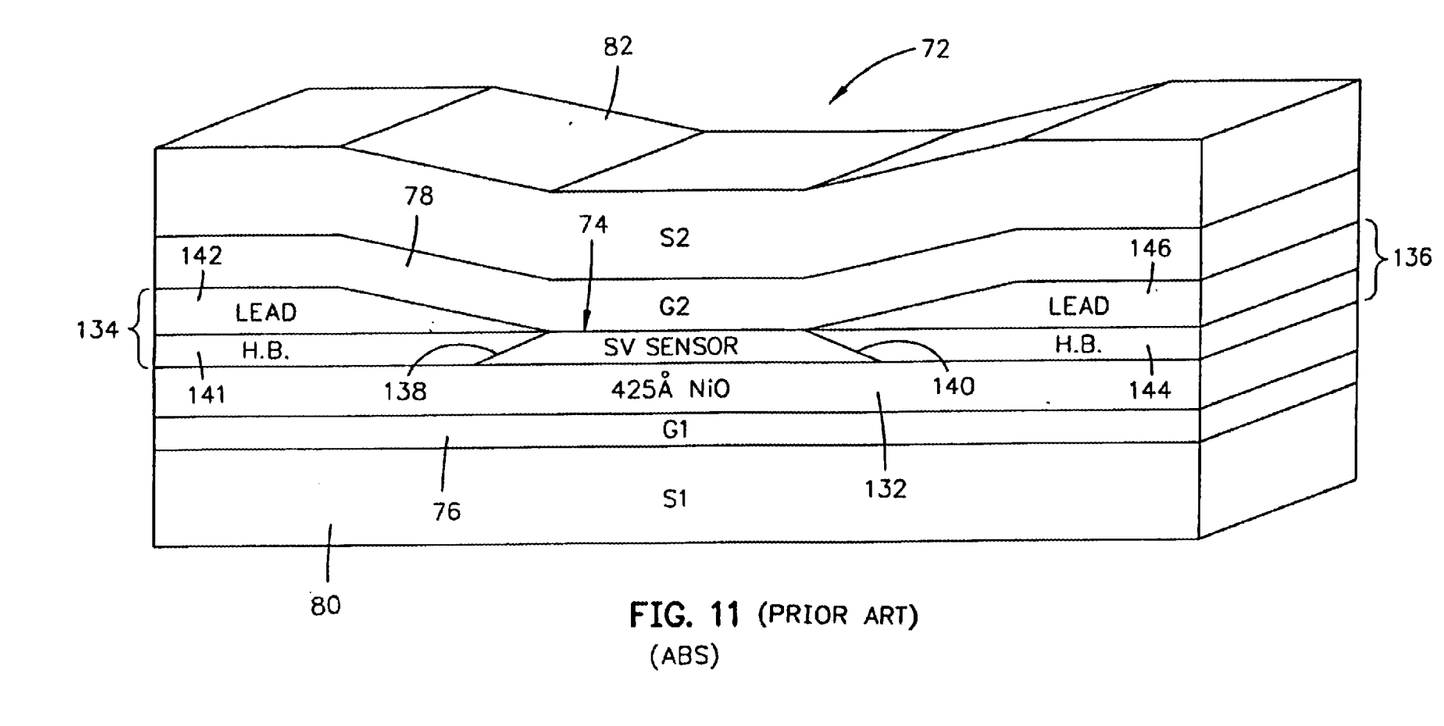
FIG. 11 is an enlarged isometric illustration of the read head with a spin valve sensor.

FIG. 11 is an isometric ABS illustration of the read head 72 shown in FIGS. 8 or 9. The read head 72 includes the spin valve sensor 74. An antiferromagnetic pinning layer 132 of nickel oxide (NiO) may interface the sensor 74 for pinning a magnetic moment of a pinned layer therein. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 141 and a first lead layer 142 and the second hard bias and lead layers 136 include a second hard bias layer 144 and a second lead layer 146. The hard bias layers 141 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78. The first and second read gap layers 76 and 78 are, in turn, located between the ferromagnetic first and second shield layers 80 and 82.

Figure 12:
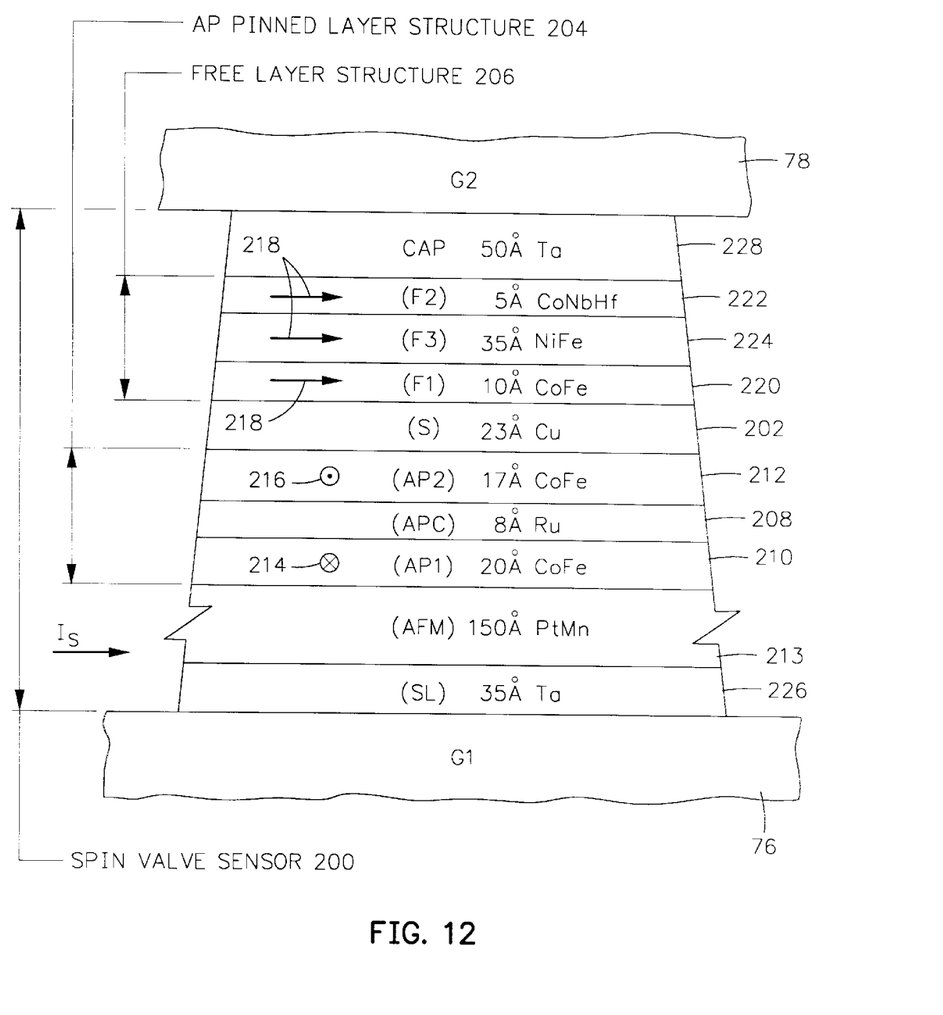
FIG. 12 is an enlarged ABS illustration of a first embodiment of the present spin valve sensor.

A first embodiment of the present spin valve sensor 200 is illustrated in FIG. 12 wherein the spin valve sensor 200 is located between the first and second read gap layers 76 and 78. The spin valve sensor 200 includes a spacer layer (S) 202 which is located between a pinned layer structure, such as an antiparallel (AP) pinned layer structure 204, and a free layer structure 206. The pinned layer structure 204 includes an antiparallel coupling (APC) layer 208 which is located between first and second antiparallel layers (AP1) and (AP2) 210 and 212. The first AP pinned layer 210 is exchange coupled to an antiferromagnetic (AFM) pinning layer 213 which pins a magnetic moment 214 of the first AP pinned layer perpendicular to the ABS, such as out of the sensor or into the sensor, as shown in FIG. 12. By a strong antiparallel coupling field between the first and second AP pinned layers 210 and 212, a magnetic moment 216 of the second AP pinned layer is antiparallel to the magnetic moment 214.

The free layer structure 206 has a magnetic moment 218 which is oriented parallel to the ABS from either right to left or from left to right, as shown in FIG. 12. When a signal field rotates the magnetic moment 218 into the sensor the magnetic moments 218 and 216 become more antiparallel which increases the resistance of the sensor to a sense current $I_s$ and when a signal field rotates the magnetic moment 218 out of the head the magnetic moments 218 and 216 become more parallel which reduces the resistance of the sensor. These increases and decreases in the resistance of the sensor are processed as playback signals by the processing circuitry 50 in FIG. 3.

The free layer structure 206 includes a first free layer (F1) 220, a second free layer (F2) 222 and a third free layer (F3) 224. The first free layer 220 is cobalt or cobalt iron, the second free layer 222 is cobalt niobium or cobalt niobium hafnium and the third free layer 224 is nickel iron. It is important that the first free layer 220 interface the spacer layer 202 for increasing the magnetoresistive coefficient dr/R of the sensor. Further, it is preferred that the third free layer 224 be located between the first and second free layers 220 and 222 so that the structure of the nickel iron of the third layer is not affected by the texture of the second layer 222. It should be noted that cobalt niobium or cobalt niobium hafnium is amorphous. The first free layer 220 is preferably $Co_{90}Fe_{10}$, the third free layer 224 is preferably $Ni_{83}Fe_{17}$ and the second free layer is preferably $Co_{92}Nb_5Hf_3$. Exemplary thicknesses of the layers are 10 Å for the first free layer 220, 35 Å for the third free layer 224 and 5 Å for the second free layer 222. Alternatively, the second free layer may be $Co_{95}Nb_5$. In this embodiment the second free layer may be thinner than 5 Å. It should be noted that the cobalt niobium or cobalt niobium hafnium second free layer 222 provides a negative magnetostriction which completely or at least partially counterbalances a positive magnetostriction of the first free layer 220. A seed layer (SL) 226 of tantalum may be provided between the pinning layer 212 and the first read gap layer 76 for promoting a desirable microstructure of the layers deposited thereon and a cap layer 228 of tantalum may be located on top of the second free layer 222 for protecting the free layer structure from subsequent processing steps.

The thicknesses and materials of the layers not already discussed are 35 Å of tantalum for the seed layer 226, 150 Å of platinum manganese for the pinning layer 212, 20 Å of cobalt iron for the first AP pinned layer 210, 8 Å of ruthenium for the antiparallel coupling layer 208, 17 Å of cobalt iron for the second AP pinned layer 212, 23 Å of copper for the spacer layer 202 and 50 Å of tantalum for the cap layer 228.

Figure 13:
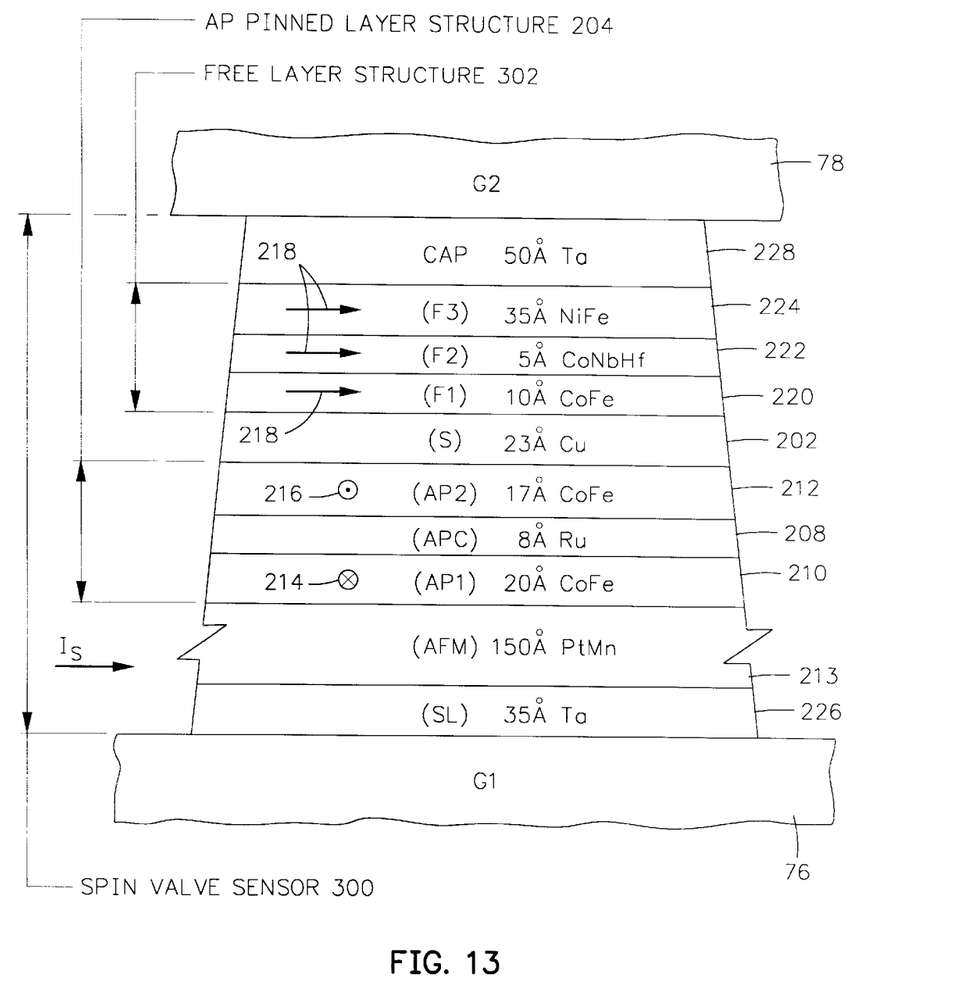
FIG. 13 is an enlarged ABS illustration of a second embodiment of the present spin valve sensor.

A second embodiment of the spin valve sensor 300 is shown in FIG. 13 which is located between the first and second read gap layers 76 and 78. The spin valve sensor 300 in FIG. 13 is the same as the spin valve sensor in FIG. 12 except the second free layer 222 is located between the first free layer 220 and the third free layer 224. While the second free layers 222 location in FIG. 13 may decrease the magnetoresistive coefficient dr/R of the sensor, this embodiment is considered to be within the scope of the present invention.

Figure 14:
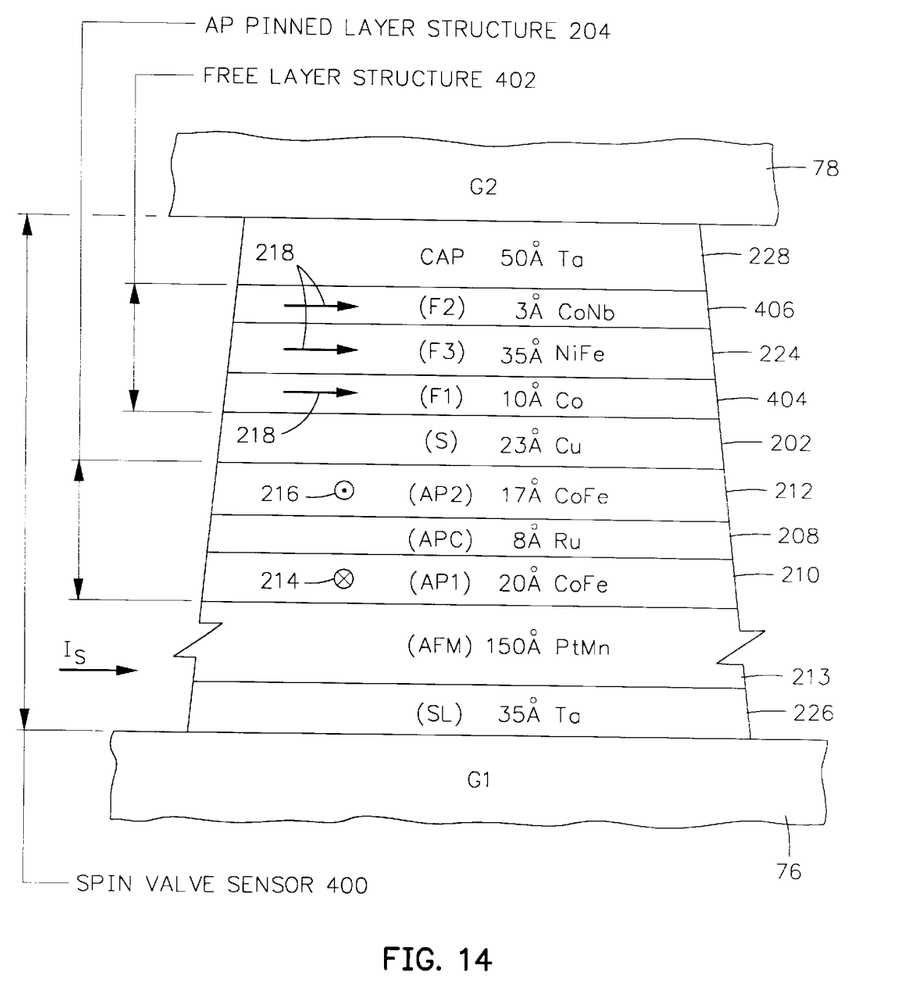
FIG. 14 is an enlarged ABS illustration of a third embodiment of the present spin valve sensor.

A third embodiment 400 of the present spin valve sensor is shown in FIG. 14 wherein the spin valve sensor is located between the first and second read gap layers 76 and 78. The spin valve sensor 400 is the same as the spin valve sensor 200 in FIG. 12 except for the free layer structure 402. The free layer structure 402 in FIG. 14 differs from the free layer structure 206 in FIG. 12 in that a first free layer 404 is cobalt and the second free layer 406 is cobalt niobium. As stated hereinabove, when cobalt niobium is used for the second free layer it may be thinner than the cobalt niobium hafnium layer, since the negative magnetostriction input of the niobium is not counterbalanced by the positive magnetostriction of the hafnium. Accordingly, the cobalt niobium second free layer 406 in FIG. 14 is shown as being 3 Å instead of 5 Å.

Figure 15:
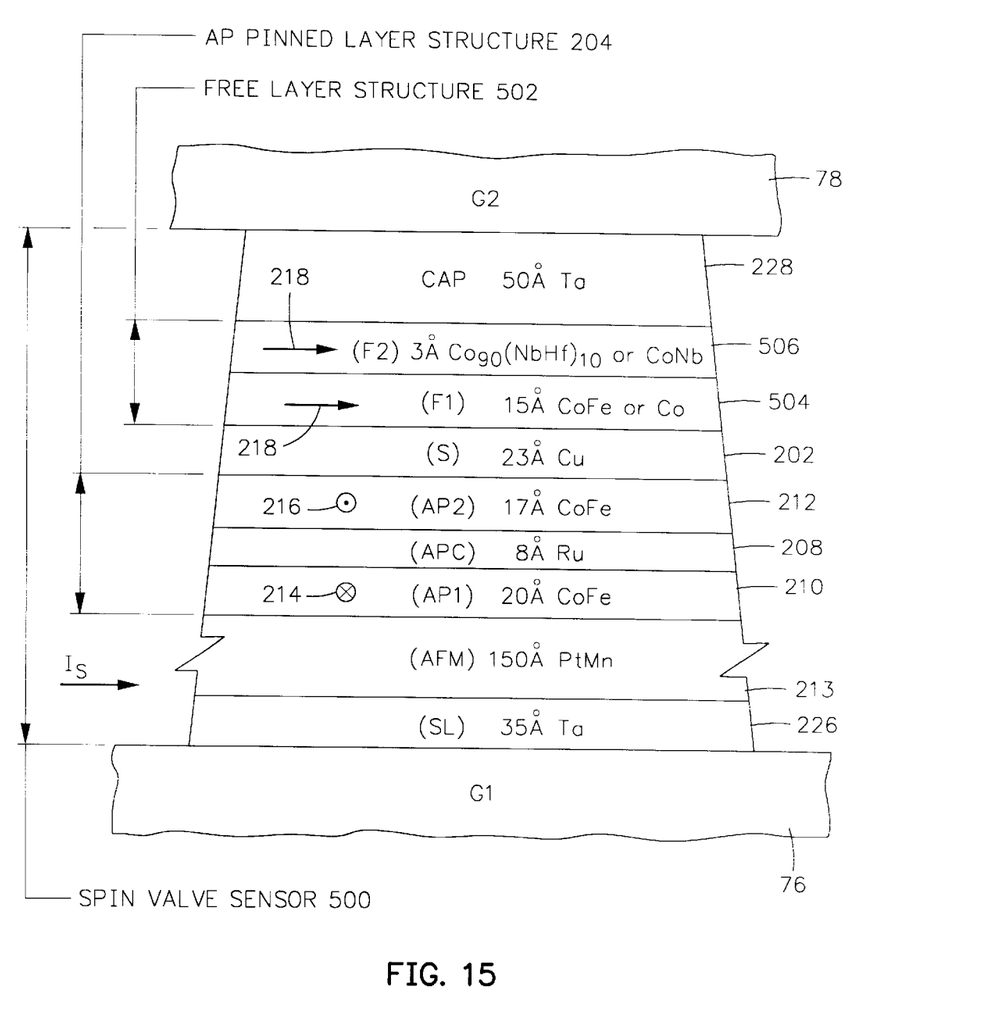
FIG. 15 is an enlarged ABS illustration of a fourth embodiment of the present spin valve sensor.

A fourth embodiment 500 of the present spin valve sensor is shown in FIG. 15 wherein the sensor is located between the first and second read gap layers 76 and 78. The spin valve sensor 500 is the same as the spin valve sensor 200 in FIG. 12 except for a free layer structure 502. The free layer 502 consists of only a cobalt iron or cobalt first free layer (F1) 504 and a cobalt niobium or cobalt niobium hafnium second free layer (F2) 506 with the first free layer 504 interfacing the spacer layer 202 and being located between the spacer layer and the second free layer 506. In this embodiment the thickness of the first layer may be increased to 15 Å which is considered to be an optimized thickness of the cobalt iron or cobalt layer for maximizing or optimizing the magnetoresistive coefficient dr/R. This increased thickness of the first free layer 504 obviously increases the positive magnetostriction which is undesirable. However, the second free layer is provided with an appropriate ratio of cobalt niobium or cobalt niobium hafnium with a proper thickness which provides a negative magnetostriction which completely counterbalances the positive magnetostriction of the first free layer 504 with a preferred excess for establishing a uniaxial anisotropy of the free layer structure 502 along the ABS, as shown in FIG. 15. The excess can be small so that the uniaxial anisotropy $H_K$ is likewise small. This means that the free layer structure 502 will have a magnetic softness so that the magnetic moment 218 of the free layer structure is highly responsive to field signals from the rotating magnetic disk. By eliminating the nickel iron free layer, the free layer structure is thinner which decreases the stacked height of the sensor and increases the linear read bit density of the read head. An exemplary free layer structure 502 is 15 Å of $Co_{90}Fe_{10}$ and 20 Å of $Co_{90}Nb_5Hf_3$ or 15 Å of $Co_{90}Fe_{10}$ and 15Å of $Co_{95}Nb_5$. Other ratios and thicknesses may be employed depending upon the stiffness of the free layer structure desired. In the construction of rows and columns of magnetic heads employing the spin valve sensor 500 in FIG. 15 the wafer can be subjected to longitudinal annealing which involves applying a magnetic field parallel to the ABS in the presence of heat for orienting the magnetic moment of the second free layer parallel to the ABS, as shown in FIG. 15. This will align the magnetic moment of the first free layer parallel thereto. Since the first free layer is located between the spacer layer 202 and the second free layer 506, the second free layer 506 will have no impact on the microstructure of the first free layer due to the amorphous characteristic of the second free layer.

Discussion

It should be understood that a single pinned layer may be employed in lieu of the AP pinned layer structure 204 in FIGS. 12–15. However, the preferred pinned layer structure is the AP pinned layer structure 204, as shown. In the cobalt niobium or cobalt niobium hafnium layers the cobalt should be at least 90%. The preferred composition of the materials are $Pt_{50}Mn_{50}$ for the platinum manganese pinning layers, $Ni_{83}Fe_{17}$ for the nickel iron layers, and $Co_{90}Fe_{10}$ for the cobalt iron layers. It should be understood that cobalt may be substituted for the cobalt iron layers and that other materials may be used for the pinning layers such as nickel manganese or iridium manganese.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:
   a spin valve sensor including:
     a ferromagnetic pinned layer structure that has a magnetic moment;
     a pinning layer exchange coupled to the pinned layer structure for pinning the magnetic moment of the pinned layer structure;
     a free layer structure;
     a nonmagnetic electrically conductive spacer layer located between the free layer structure and the pinned layer structure;
   the free layer structure including:
     a first free layer composed of cobalt or cobalt iron that interfaces the spacer layer;
     a second free layer composed of cobalt niobium or cobalt niobium hafnium wherein the cobalt is at least 90%; and the second free layer having a negative magnetostriction which at least partially counterbalances a positive magnetostriction of a remainder of the free layer structure.

2. A magnetic read head as claimed in claim 1 including:
   nonmagnetic electrically nonconductive first and second read gap layers;
   the spin valve sensor being located between the first and second read gap layers;
   ferromagnetic first and second shield layers; and
   the first and second read gap layers being located between the first and second shield layers.

3. A magnetic read head as claimed in claim 2 wherein the first free layer is $Co_{90}Fe_{10}$.

4. A magnetic read head as claimed in claim 3 wherein the second free layer is $Co_{95}Nb_5$.

5. A magnetic read head as claimed in claim 3 wherein the second free layer is $Co_{92}Nb_5Hf_3$.

6. A magnetic read head as claimed in claim 2 wherein the free layer structure further includes a third free layer composed of nickel iron.

7. A magnetic read head as claimed in claim 6 wherein the third free layer is located between and interfaces each of the first and second free layers.

8. A magnetic read head as claimed in claim 2 wherein the free layer structure consists of only the first and second free layers.

9. A magnetic head assembly having an air bearing surface (ABS), comprising:
   a write head including:
     ferromagnetic first and second pole piece layers that have a yoke portion located between a pole tip portion and a back gap portion;
     a nonmagnetic write gap layer located between the pole tip portions of the first and second pole piece layers;
     an insulation stack with at least one coil layer embedded therein located between the yoke portions of the first and second pole piece layers; and
     the first and second pole piece layers being connected at their back gap portions; and
   a read head including:
     a spin valve sensor;
     nonmagnetic electrically nonconductive first and second read gap layers;
     the spin valve sensor being located between the first and second read gap layers;
     a ferromagnetic first shield layer; and
     the first and second gap layers being located between the first shield layer and the first pole piece layer; and
   the spin valve sensor including:
     a ferromagnetic pinned layer structure that has a magnetic moment;
     a pinning layer exchange coupled to the pinned layer structure for pinning the magnetic moment of the pinned layer structure;
     a free layer structure;
     a nonmagnetic conductive spacer layer located between the free layer structure and the pinned layer structure;
   the free layer structure including:
     a first free layer composed of cobalt or cobalt iron that interfaces the spacer layer;
     a second free layer composed of cobalt niobium or cobalt niobium hafnium wherein the cobalt is at least 90%; and the second free layer having a negative magnetostriction which at least partially counterbalances a positive magnetostriction of a remainder of the free layer structure.

10. A magnetic head assembly as claimed in claim 9 including:
    a ferromagnetic second shield layer;
    a nonmagnetic isolation layer located between the second shield layer and the first pole piece layer.

11. A magnetic head assembly as claimed in claim 9 wherein the free layer structure further includes a third free layer composed of nickel iron.

12. A magnetic head assembly as claimed in claim 11 wherein the third free layer is located between and interfaces each of the first and second free layers.

13. A magnetic head assembly as claimed in claim 9 wherein the free layer structure consists of only the first and second free layers.

14. A magnetic disk drive including at least one magnetic head assembly that has an air bearing surface (ABS) and that includes a write head and a read head, comprising:
    a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
    a read head including:
      a spin valve sensor;
      nonmagnetic electrically nonconductive first and second read gap layers;

the spin valve sensor being located between the first and second read gap layers;
a ferromagnetic first shield layer; and
the first and second read gap layers being located between the first shield layer and the first pole piece layer; and
the spin valve sensor including:
a ferromagnetic pinned layer structure that has a magnetic moment;
a pinning layer exchange coupled to the pinned layer structure for pinning the magnetic moment of the pinned layer structure;
a free layer structure;
a nonmagnetic electrically conductive spacer layer located between the free layer structure and the pinned layer structure;
the free layer structure including:
a first free layer composed of cobalt or cobalt iron that interfaces the spacer layer;
a second free layer composed of cobalt niobium or cobalt niobium hafnium wherein the cobalt is at least 90%; and the second free layer being formed with a negative magnetostriction which at least partially counterbalances a positive magnetostriction of a remainder of the free layer structure.
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

15. A magnetic disk drive as claimed in claim 14 including:
a ferromagnetic second shield layer;
a nonmagnetic isolation layer located between the second shield layer and the first pole piece layer.

16. A magnetic disk drive as claimed in claim 14 wherein the free layer structure further includes a third free layer composed of nickel iron.

17. A magnetic disk drive as claimed in claim 16 wherein the third free layer is located between and interfaces each of the first and second free layers.

18. A magnetic disk drive as claimed in claim 14 wherein the free layer structure consists of only the first and second free layers.

19. A method of making a magnetic read head which has an air bearing surface (ABS), comprising the steps of:
a making a spin valve sensor comprising the steps of:
forming a ferromagnetic pinned layer structure that has a magnetic moment;
forming a pinning layer exchange coupled to the pinned layer structure for pinning the magnetic moment of the pinned layer structure;
forming a free layer structure;
forming a nonmagnetic electrically conductive spacer layer between the free layer structure and the pinned layer structure;
the free layer structure including:
a first free layer composed of cobalt or cobalt iron that interfaces the spacer layer;
a second free layer composed of cobalt niobium or cobalt niobium hafnium wherein the cobalt is at least 90%; and the second free layer being formed with a negative magnetostriction which at least partially counterbalances a positive magnetostriction of a remainder of the free layer structure.

20. A method of making a magnetic read head as claimed in claim 19 including:
forming nonmagnetic electrically nonconductive first and second read gap layers;
forming the spin valve sensor between the first and second read gap layers;
forming ferromagnetic first and second shield layers; and
forming the first and second read gap layers between the first and second shield layers.

21. A method of making a magnetic read head as claimed in claim 23 wherein the first free layer is formed of $Co_{90}Fe_{10}$.

22. A method of making a magnetic read head as claimed in claim 21 wherein the third free layer is formed between and interfacing each of the first and second free layers.

23. A method of making a magnetic read head as claimed in claim 21 wherein the free layer structure is formed consisting of only the first and second free layers.

24. A method of making a magnetic read head as claimed in claim 20 wherein the free layer structure is further formed with a third free layer composed of nickel iron.

25. A method of making a magnetic read head as claimed in claim 24 wherein the third free layer is formed between and interfacing each of the first and second free layers.

26. A method of making a magnetic read head as claimed in claim 20 wherein the free layer structure is formed consisting of only the first and second free layers.

27. A method of making magnetic head assembly that has an air bearing surface (ABS), comprising the steps of:
making a write head including the steps of:
forming ferromagnetic first and second pole piece layers in pole tip, yoke and back gap regions wherein the yoke region is located between the pole tip and back gap regions;
forming a nonmagnetic electrically nonconductive write gap layer between the first and second pole piece layers in the pole tip region;
forming an insulation stack with at least one coil layer embedded therein between the first and second pole piece layers in the yoke region; and
connecting the first and pole piece layers at said back gap region; and
making a read head including the steps of:
forming nonmagnetic electrically nonconductive first and second read gap layers;
forming a spin valve sensor between the first and second read gap layers;
forming the first and second read gap layers between the first shield layer and the first pole piece layer; and
a making of the spin valve sensor comprising the steps of:
forming a ferromagnetic pinned layer structure that has a magnetic moment;
forming a pinning layer exchange coupled to the pinned layer structure for pinning the magnetic moment of the pinned layer structure;
forming a free layer;
forming a nonmagnetic electrically conductive spacer layer between the free layer and the pinned layer structure;

the free layer structure including:
- a first free layer composed of cobalt or cobalt iron that interfaces the spacer layer;
- a second free layer composed of cobalt niobium or cobalt niobium hafnium wherein the cobalt is at least 90%; and the second free layer being formed with a negative magnetostriction which at least partially counterbalances a positive magnetostriction of a remainder of the free layer structure.

28. A method of making a magnetic head assembly as claimed in claim 27 including the steps of:
forming a ferromagnetic second shield layer; and
forming a nonmagnetic isolation layer between the second shield layer and the first pole piece layer.

29. A method of making a magnetic head assembly as claimed in claim 27 wherein the free layer structure is further formed with a third free layer composed of nickel iron.

30. A method of making a magnetic head assembly as claimed in claim 29 wherein the third free layer is formed between and interfacing each of the first and second free layers.

31. A method of making a magnetic head assembly as claimed in claim 27 wherein the free layer structure is formed consisting of only the first and second free layers.

* * * * *